(12) United States Patent
Howard et al.

(10) Patent No.: US 11,157,815 B2
(45) Date of Patent: Oct. 26, 2021

(54) EFFICIENT CONVOLUTIONAL NEURAL NETWORKS AND TECHNIQUES TO REDUCE ASSOCIATED COMPUTATIONAL COSTS

(71) Applicant: Google LLC, Mountain View, CA (US)

(72) Inventors: Andrew Gerald Howard, Culver City, CA (US); Bo Chen, Pasadena, CA (US); Dmitry Kalenichenko, Los Angeles, CA (US); Tobias Christoph Weyand, Venice, CA (US); Menglong Zhu, Los Angeles, CA (US); Marco Andreetto, Pasadena, CA (US); Weijun Wang, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 72 days.

(21) Appl. No.: 16/524,410

(22) Filed: Jul. 29, 2019

(65) Prior Publication Data

US 2019/0347537 A1 Nov. 14, 2019

Related U.S. Application Data

(63) Continuation of application No. 15/707,064, filed on Sep. 18, 2017.

(60) Provisional application No. 62/422,529, filed on Nov. 15, 2016.

(51) Int. Cl.
*G06N 3/08* (2006.01)
*G06N 3/04* (2006.01)

(52) U.S. Cl.
CPC ............. *G06N 3/082* (2013.01); *G06N 3/04* (2013.01); *G06T 2207/20084* (2013.01)

(58) Field of Classification Search
None
See application file for complete search history.

(56) References Cited

U.S. PATENT DOCUMENTS

| | | | |
|---|---|---|---|
| 10,185,891 B1 * | 1/2019 | Martin | G06K 9/4628 |
| 2016/0217369 A1 * | 7/2016 | Annapureddy | G06N 3/082 |

(Continued)

OTHER PUBLICATIONS

Sifre, Rigid-Motion Scattering for Image Classification (Year: 2014).*

(Continued)

*Primary Examiner* — Kamran Afshar
*Assistant Examiner* — Benjamin J Buss
(74) *Attorney, Agent, or Firm* — Dority & Manning, P.A.

(57) ABSTRACT

The present disclosure provides systems and methods to reduce computational costs associated with convolutional neural networks. In addition, the present disclosure provides a class of efficient models termed "MobileNets" for mobile and embedded vision applications. MobileNets are based on a straight-forward architecture that uses depthwise separable convolutions to build light weight deep neural networks. The present disclosure further provides two global hyper-parameters that efficiently trade-off between latency and accuracy. These hyper-parameters allow the entity building the model to select the appropriately sized model for the particular application based on the constraints of the problem. MobileNets and associated computational cost reduction techniques are effective across a wide range of applications and use cases.

10 Claims, 8 Drawing Sheets

(56) References Cited

U.S. PATENT DOCUMENTS

2017/0337472 A1* 11/2017 Durdanovic ......... G06N 3/0454
2018/0357744 A1* 12/2018 Pattichis .............. G06K 9/4642

OTHER PUBLICATIONS

Jaderberg et al, Speeding up Convolutional Neural Networks with Low Rank Expansions (Year: 2014).*
Costea et al, Aerial image geolocalization from recognition and matching of roads and intersections (Year: 2016).*
Matsugu et al, Subject independent facial expression recognition with robust face detection using a convolutional neural network (Year: 2003).*
Xie et al, Hyper-class Augmented and Regularized Deep Learning for Fine-grained Image Classification (Year: 2015).*
Zhu et al, Orientation Robust Object Detection in Aerial Images Using Deep Convolutional Neural Network (Year: 2015).*
Howard, A.G. et al. (Apr. 17, 2017). "MobileNets: Efficient Convolutional Neural Networks for Mobile Vision Applications". 9 pages. arXiv:1704.04861v1 (Year: 2017).*
Wang, M. et al. (Aug. 15, 2016). "Factorized Convolutional Neural Networks". 10 pages. arXiv:1608.04337v1 (Year: 2017).*
Abadi et al., "TensorFlow: Large-Scale Machine Learning on Heterogeneous Systems", Preliminary White Paper, Nov. 9, 2015.
Chen et al., "Compressing Neural Networks with the Hashing Trick", arXiv:1504.04788v1, Apr. 19, 2015, 10 pages.
Chollet, "Xception: Deep Learning with Depthwise Separable Convolutions", arVix:1610,02357v2, Oct. 11, 2016, 14 pages.
Courbariaux et al., "Training Deep Neural Networks with Low Precision Multiplications", arXiv:1412.7024v5, Sep. 23, 2015, 10 pages.
Han et al., "Deep Compression: Compressing Deep Neural Network with Pruning, Trained Quantization and Huffman Coding", arXiv:1510.00149v2, Nov. 20, 2015, 13 pages.
Hays et al., "IM2GPS: Estimating Geographic Information from a Single Image" IEEE International Conference on Computer Vision and Pattern Recognition, Anchorage, Alaska, Jun. 24-26, 2008, 8 pages.
Hays et al., "Large-Scale Image Geolocalization", Chapter 3 of Multimodal Location Estimation of Videos and Images, Springer, 2014, pp. 41-62.
He et al., "Deep Residual Learning for Image Recognition", arXiv:1512.03385v1, Dec. 10, 2015, 12 pages.
Hinton et al., "Distilling the Knowledge in a Neural Network", arXiv:1503.02531v1, Mar. 9 2015, 9 pages.
Hinton et al., "Lecture 6e-Rmsprop: Divide the Gradient by a Running Average of its Recent Magnitude", https://www.youtube.com/watch?v=ZgLyc7CY1Ww, published on Aug. 3, 2014—6 pages.
Huang et al., Speed/Accuracy Trade-Offs for Modern Convolutional Object Detectors, Computer Vision and Pattern Recognition Las Vegas, Nevada, Jun. 26-Jul. 1, 2016, 10 pages.
Hubara et al., "Quantized Neural Networks: Training Neural Networks with Low Precision Weights and Activations", arXiv:1609.07061v1, Sep. 22, 2016, 29 pages.
Iandola et al., "SqueezeNet: AlexNet-Level Accuracy with 50x Fewer Parameters and <1MB Model Size", arXiv.1602.07360v1, Feb. 24, 2016, 5 pages.
Ioffe et al., "Batch Normalization: Accelerating Deep Network Training by Reducing Internal Covariate Shift" arXiv:1502.03167v3, Mar. 2, 2015, 11 pages.
Jaderberg et al., "Speeding Up Convolutional Neural Networks with Low Rank Expansions", arXiv:1405.3866v1, May 15, 2014, 12 pages.
Jia et al., "Caffe: Convolutional Architecture for Fast Feature Embedding", arXiv:1408.5093v1, Jun. 20, 2014, 4 pages.
Jin et al., "Flattened Convolutional Neural Networks for Feedforward Acceleration" arXiv:1412.5474v1, Dec. 17, 2014, 9 pages.
Khosla et al., "Novel Dataset for Fine-Grained Image Categorization", First Workshop on Fine-Grained Visual Categorization, IEEE Conference on Computer Vision and Pattern Recognition, Colorado Springs, Colorado, Jun. 20-25, 2011, 2 pages.
Krause et al., "The Unreasonable Effectiveness of Noisy Data for Fine-Grained Recognition", arXiv:1511.06789v1, Nov. 20, 2015, 11 pages.
Krizhevsky et al., "ImageNet Classification with Deep Convolutional Neural Networks", Advances in Neural Information Processing Systems, Lake Tahoe, Nevada, Dec. 3-8, 2012, pp. 1097-1105.
Lebedev et al., "Speeding-Up Convolutional Neural Networks using Fine-Tuned CP-Decomposition", arXiv:1412.6553v2, Dec. 24, 2014, 10 pages.
Liu et al., "SSD: Single Shot MultiBox Detector" arXic:1512.02325v1, Dec. 8, 2015, 9 pages.
Rastegari et al., "XNOR-Net: ImageNet Classification Using Binary Convolutional Neural Networks", arXiv:1603.05279v4, Aug. 2, 2016, 17 pages.
Ren et al., "R-CNN: Towards Real-Time Object Detection with Region Proposal Networks", arXiv:1506.01497v1, Jun. 4, 2015, 10 pages.
Russakovsky et al., "Imagenet Large Scale Visual Recognition Challenge", International Journal of Computer Vision, vol. 115, Issue 3, 2015, pp. 211-252.
Schroff et al., "Facenet: A Unified Embedding for Face Recognition and Clustering", arXiv:1503.03832v1, Mar. 12, 2015, 9 pages.
Sifre, "Rigid-Motion Scattering for Image Classification", Ecole Polytechnique PhD Thesis, Oct. 6, 2014, 128 pages.
Simonyan et al, "Very Deep Convolutional Networks for Large-Scale Image Recognition", arXiv:1409.1556v1, Sep. 4, 2014, 10 pages.
Sindhwani et al., "Structured Transforms for Small-Footprint Deep Learning", Advances in Neural Information Processing Systems, Montreal, Canada, Dec. 7-12, 2015, pp. 3088-3096.
Szegedy", Inception-v4, Inception-ResNet and the Impact of Residual Connections on Learning" arXiv:1602.07261v2, Aug. 23, 2016, 12 pages.
Szegedy et al., "Going Deeper with Convolutions", arXiv:1409.4842v1, Sep. 17, 2014, 12 pages.
Szegedy et al., "Rethinking the Inception Architecture for Computer Vision" arXiv:1512,00567v3, Dec. 11, 2015, 10 pages.
Thomee et al., "YFCC100M: The New Data in Multimedia Research", Communications of the ACM, vol. 59, Issue 2, 2016, pp. 64-73.
Wang et al., "Factorized Convolutional Neural Networks", arXiv:1608.04337v1, Aug. 15, 2016, 10 pages.
Weyand et al., "PlaNet-Photo Geolocation with Convolutional Neural Networks", arXiv:1602.05314v1, Feb. 17, 2016, 10 pages.
Wu et al.., "Quantized Convultional Neural Networks for Mobile Devices" arXiv:1512.06473v1, Dec. 21, 2015, 11 pages.
Yang et al., "Deep Fried Convnets", arXiv:1412.27149v2, Feb. 27, 2015, 10 pages.

* cited by examiner

EFFICIENT CONVOLUTIONAL NEURAL NETWORKS AND TECHNIQUES TO REDUCE ASSOCIATED COMPUTATIONAL COSTS

PRIORITY CLAIM

The present application is a continuation of U.S. application Ser. No. 15/707,064 having a filing date of Sep. 18, 2017, which claims the benefit of U.S. Provisional Application No. 62/422,529 filed Nov. 15, 2016. Applicant claims priority to and the benefit of each of such applications and incorporate all such applications herein by reference in its entirety.

FIELD

The present disclosure relates generally to artificial neural networks. More particularly, the present disclosure relates to efficient convolutional neural network structures for mobile and/or embedded vision applications and also to techniques to reduce computational costs and/or memory requirements associated with convolutional neural networks.

BACKGROUND

Convolutional neural networks have become the workhorse of computer vision and have achieved state of the art results in most major use cases. A general trend in the field of convolutional neural networks has been to make bigger and more complicated networks in order to achieve higher accuracy. As convolutional neural networks increase in size and complexity in service of increased accuracy, so too do they increase in computational cost. At a certain point, however, these advances yield diminishing returns, as adding complexity, size, and additional computation result in only small gains in accuracy.

The current trend toward bigger and more complicated networks is particularly problematic in the context of computing environments where certain computing resources, such as memory and processing capability, are limited. For example, mobile computing devices and/or embedded computing present challenging environments for the implementation of such large and complicated networks. Furthermore, in certain scenarios or applications, the problem to be solved by the network may not require a large, complex model that provides state of the art accuracy.

Thus, techniques for reducing computational costs and/or memory requirements of neural networks (e.g., convolutional neural networks) are desired. In some instances, such techniques can be referred to as performing neural network compression.

One general direction for neural network compression is network pruning, in which a subset of the connections included in a network are removed. However, if there are no constraints on which connections/parameters are to be removed, network pruning often results in an irregular network. Such a network is undesirable because computational savings cannot be easily exploited and the unstructured nature of connections requires extra efforts to represent. These drawbacks affect negatively on training time and memory usage. On the other hand, if the constraints on the parameters to be removed are too restrictive, the model flexibility is diminished.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to reduce computational costs associated with convolutional neural networks. The method includes obtaining, by one or more computing devices, an existing convolutional neural network structure. The existing convolutional neural network structure includes one or more convolutional layers. Each of the one or more convolutional layers has a respective existing number of filters. The method includes receiving, by the one or more computing devices, a width multiplier value. The method includes determining, by the one or more computing devices, a respective reduced number of filters for each of the one or more convolutional layers based at least in part on the width multiplier value. The reduced number of filters for each convolutional layers is less than the existing number of filters for such convolutional layer. The method includes generating, by the one or more computing devices, a reduced convolutional neural network structure that has the existing convolutional neural network structure except that each of the one or more convolutional layers in the reduced convolutional neural network has the respective reduced number of filters determined for such convolutional layer.

Another example aspect of the present disclosure is directed to a computer-implemented method to reduce computational cost associated with a convolutional neural network. The method includes obtaining, by the one or more computing devices, an input image that has an existing resolution. The method includes receiving, by the one or more computing devices, a resolution multiplier value. The method includes determining, by the one or more computing devices, a reduced resolution for the input image based at least in part on the existing resolution and the resolution multiplier value. The method includes modifying, by the one or more computing devices, the input image to have the reduced resolution. The method includes inputting, by the one or more computing devices, the modified input image into the convolutional neural network.

Another example aspect of the present disclosure is directed to a convolutional neural network structure that is optimizable for mobile or embedded applications. The convolutional neural network structure includes a plurality of depthwise separable convolution layers. Each depthwise separable convolution layer includes a depthwise convolution layer and a pointwise convolution layer. The convolutional neural network structure has user-adjustable parameters that include one or more of: a number of the plurality of depthwise separable convolution layers; and a respective number of filters included in the depthwise convolution layer of each of the plurality of depthwise separable convolution layers.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
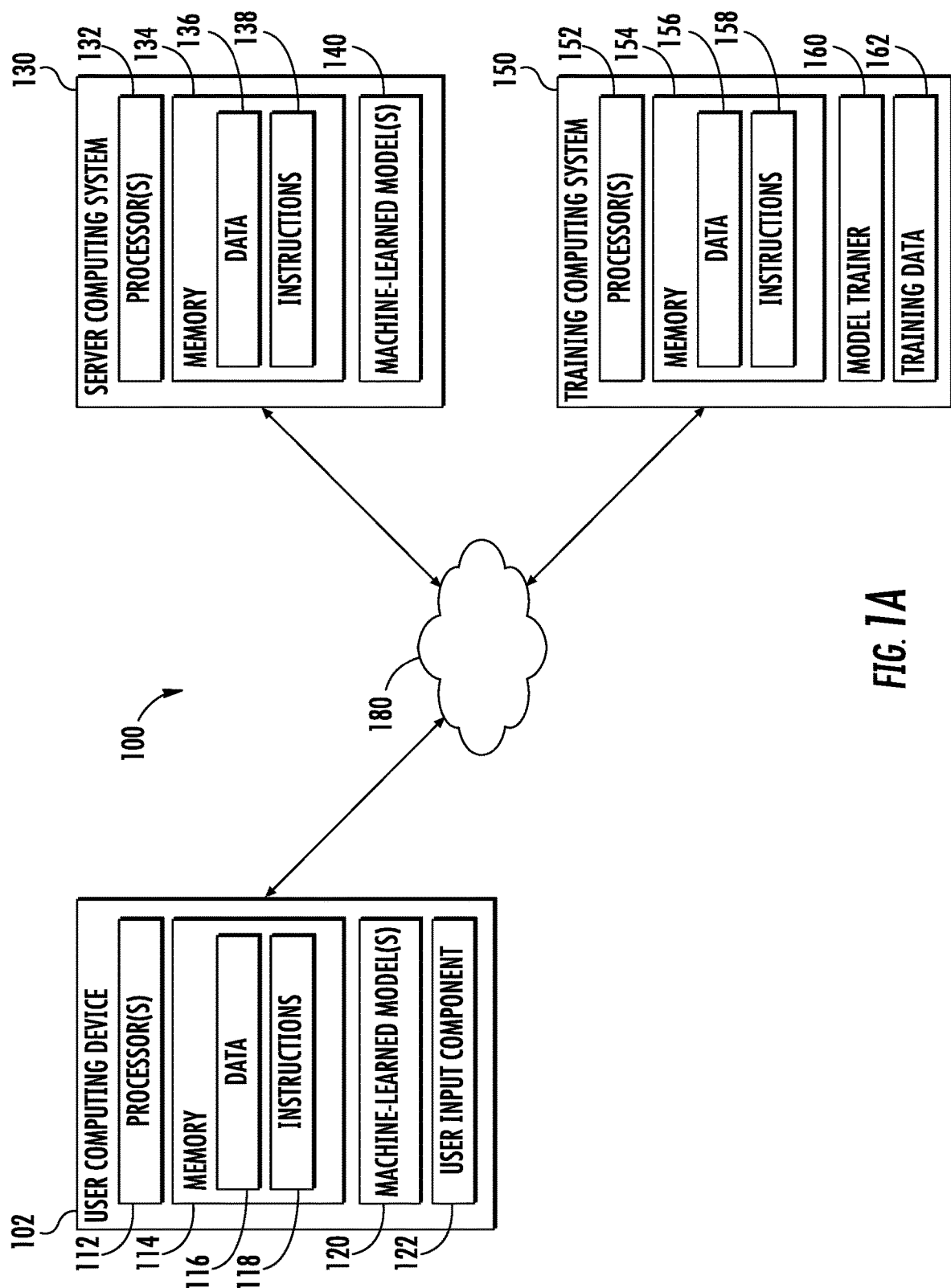
FIG. 1A depicts a block diagram of an example computing system according to example embodiments of the present disclosure.

Reference numerals that are repeated across plural figures are intended to identify the same features in various implementations.

DETAILED DESCRIPTION

Overview

Generally, the present disclosure is directed to efficient convolutional neural network structures for mobile and/or embedded vision applications and also to techniques for reducing computational costs and/or memory requirements associated with convolutional neural networks. In particular, the present disclosure provides an efficient network structure and a set of two hyper-parameters that can be used to build very small, low latency models that can be easily matched to the design requirements for mobile and embedded vision applications. The two hyper-parameters—a width multiplier and a resolution multiplier—can be applied in the context of the particular efficient network structure described herein or can be applied to convolutional neural networks in general to reduce computational costs and/or memory requirements associated with such convolutional neural networks.

More particularly, according to one aspect of the present disclosure, the present disclosure provides a class of convolutional neural network architectures and models that are referred to herein as "MobileNets." MobileNets are based on a straight-forward architecture that uses depthwise separable convolutions to build light weight deep neural networks. In particular, MobileNets allow a model developer to specifically choose a small network that matches the resources restrictions (e.g., latency, size) for a particular application or use case. Due to their size and low latency, MobileNets can be particularly useful for implementation in mobile, embedded, or other limited-resource computing environments.

As noted, MobileNets can be built primarily from depthwise separable convolutions, which are a form of factorized convolutions that factorize a standard convolution into a depthwise convolution and a 1×1 convolution called a pointwise convolution. For example, the depthwise convolution can apply a single filter to each input channel, and the point convolution then applies a 1×1 convolution to combine the outputs of the depthwise convolution. Such structure is distinct from a standard convolution that both filters and combines inputs into a new set of outputs in one step. Thus, the depthwise separable convolution splits this into two layers, a separate layer for filtering and a separate layer for combine. This factorization has the effect of drastically reducing computation and model size.

In some implementations, the efficient convolutional neural networks (e.g., "MobileNets") of the present disclosure can include a plurality of depthwise separable convolution layers. In some implementations, the plurality of depthwise separable convolution layers can be stacked one after another.

As described above, each depthwise separable convolution layer can include a depthwise convolution layer and a pointwise convolution layer. In one particular example, each depthwise separable convolution layer can include a 3×3 depthwise convolution layer followed by a first batch normalization layer followed by a first rectified linear unit layer followed by a 1×1 pointwise convolution layer followed by a second batch normalization layer followed by a second rectified linear unit layer.

According to an aspect of the present disclosure, the efficient convolutional neural networks (e.g., "MobileNets") can have adjustable or "tunable" parameters that enable a model developer to appropriately design a small network that matches the resource restrictions (e.g., latency, size, etc.) for their particular application or use case. For example, adjustable parameters of the convolutional neural networks can include one or more of the following: a total number of depthwise separable convolution layers; a respective number of filters included in the depthwise convolution layer of each of the plurality of depthwise separable convolution layers; where downsampling is performed; and/or other parameters. By adjusting such various parameters, MobileNets can be optimized for latency, power consumption, memory footprint, disk footprint (e.g., binary and/or model size), and/or other objectives. Such ability to efficiently trade off accuracy for size and/or latency gains makes MobileNets highly useful and applicable to limited resource environments such as mobile or embedded devices. As examples, MobileNets have been experimentally proven to be useful for image classification, fine grained recognition, geolocalization, face attribute classification, and object detection.

According to another aspect, the present disclosure provides two hyper-parameters—a width multiplier and a resolution multiplier—that can be used to reduce computational costs and/or the size of convolutional neural networks. The width multiplier and the resolution multiplier can be applied in the context of the particular MobileNets network structure described herein or can be applied to convolutional neural networks in general to reduce computational costs and/or memory requirements associated with such convolutional neural networks.

The width multiplier can be used to reduce the computational costs and number of parameters of a convolutional neural network by reducing the number of filters (or channels) included in one or more convolutional layers of a convolutional neural network. For example, the convolutional layers can be depthwise separable convolutional layers, as described above.

More particularly, in some instances it may be desirable to modify an existing network structure to cause the resulting network to be smaller and faster. For example, an existing network structure may have been proven to laudably perform a particular objective, but may be too computationally expensive for use in a limited resource context or particular use case. As such, the width multiplier can be used to construct a smaller and less computationally expensive network structure from an existing network structure.

In particular, in some implementations, a role of the width multiplier is to thin a network at one or more convolutional layers. Such can be performed by reducing the number of existing filters (or channels) included in such layer according to the width multiplier. For example, in some implementations, the width multiplier can be a value greater than zero and less than one. Further, in some implementations, the number of existing filters in a given convolutional layer can be multiplied by the width multiplier to determine a reduced number of filters for such layer. Thus, for a given layer and width multiplier $\alpha$, the number of input channels M can become $\alpha$M and the number of output channels N can become $\alpha$N.

In the context of depthwise separable layers, use of a width multiplier $\alpha$ can have the effect of reducing computational cost and the number of parameters by roughly $\alpha^2$. However, the width multiplier can be applied to any model structure to define a new smaller model with reasonable accuracy, latency and size trade off. Thus, a width multiplier can be used to define a new reduced convolutional neural network structure. The new structure can then be newly generated or can be produced by reconfiguring an existing network structure to reduce the number of filters. A convolutional neural network that has the new reduced structure can be trained from scratch.

In some implementations, a width multiplier can be applied to each of a plurality of convolutional layers included in a convolutional neural network. For example, different, respective width multipliers can be used. As another example, the same width multiplier value can be uniformly applied to all of the convolutional layers.

In some implementations, the width multiplier value can be received as a user input. For example, a model developer can input the width multiplier value and one or more computing devices can use the width multiplier value to generate a reduced network structure based on the input width multiplier.

In other implementations, a computing system can automatically generate the width multiplier value based on desired network performance. As one example, a computing system can generate the width multiplier value based at least in part on one or more desired performance parameters and one or more existing performance parameters associated with an existing convolutional neural network structure. For example, a model developer can input the one or more desired performance parameters. Example performance parameters can include a number of parameters; a number of Mult-Adds; and/or a processing capability expressed in a number of frames processed per second.

As described above, in certain scenarios, the computational and parameter gains associated with use of a width multiplier as described herein can be mathematically discernable. For example, in the context of depthwise separable layers, use of a width multiplier $\alpha$ can have the effect of reducing computational cost and the number of parameters by roughly $\alpha^2$. Thus, given knowledge of the effects of a particular width multiplier value, the existing performance parameters, and the desired performance parameters, a computing system can automatically determine the appropriate width multiplier value that will achieve the desired performance parameters.

A second hyper-parameter provided by the present disclosure to reduce the computation cost of a neural network is a resolution multiplier $\rho$. The resolution multiplier $\rho$ can be applied to an input image to reduce the resolution of the input image. For example, the resolution multiplier $\rho$ can be a value between 0 and 1, and can be multiplied against the existing resolution of the input image to determine a reduced resolution for the input image. Any existing techniques for reducing image resolution can be used to modify the input image from the existing resolution to the reduced resolution.

As a result of such reduction in input image resolution, the internal representation of every layer of a convolutional neural network is subsequently reduced by the same resolution multiplier $\rho$. Thus, adjusting the resolution of the input image by a resolution multiplier $\rho$ has the downstream effect of also reducing the internal representation of every layer of the convolutional neural network. In addition, similar to the use of width multipliers, at least in the context of depthwise separable layers, use of a resolution multiplier $\rho$ can have the effect of reducing computational cost by $\rho^2$.

In some implementations, the resolution multiplier value can be received as a user input. For example, a model developer can input the resolution multiplier value and one or more computing devices can modify an input image according to the resolution multiplier value.

In other implementations, a computing system can automatically generate the resolution multiplier value based on desired network performance. In particular, in certain scenarios, the computational gains associated with use of a resolution multiplier as described herein can be mathematically discernable. Thus, given knowledge of the effects of a particular width multiplier value, existing performance parameters, and the desired performance parameters, a computing system can automatically determine the appropriate resolution multiplier value that will achieve the desired performance parameters.

Further, in some implementations, a convolutional neural network (e.g., a MobileNet) can be augmented with an image resolution reduction component that is positioned structurally prior to a plurality of convolution layers. The image resolution reduction component can be configured to reduce a resolution of an input image according to a resolution multiplier.

With reference now to the Figures, example embodiments of the present disclosure will be discussed in further detail.

Example Devices and Systems

FIG. 1A depicts a block diagram of one example computing system 100 that can implement the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device. In some implementations, the device 102 is not necessarily a device associated with a user but instead can be any arbitrary mobile or embedded device or system.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

The user computing device 102 can store or include one or more machine-learned models 120. For example, the machine-learned models 120 can be or can otherwise include various machine-learned models such as neural networks (e.g., deep neural networks) or other multi-layer non-linear models. Neural networks can include recurrent neural networks (e.g., long short-term memory recurrent neural networks), feed-forward neural networks, convolutional neural networks (e.g., MobileNets) or other forms of neural networks.

In some implementations, the one or more machine-learned models 120 can be received from the server computing system 130 over network 180, stored in the user computing device memory 114, and the used or otherwise implemented by the one or more processors 112. In some implementations, the user computing device 102 can implement multiple parallel instances of a single machine-learned model 120.

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can enter a communication.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

The server computing system 130 can train the machine-learned models 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 140 stored at the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained. In particular, the model trainer 160 can train a machine-learned model 140 based on a set of training data 142.

In some implementations, if the user has provided consent, the training examples can be provided by the user computing device 102 (e.g., based on communications previously provided by the user of the user computing device 102). Thus, in such implementations, the model 120 provided to the user computing device 102 can be trained by the training computing system 150 on user-specific communication data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the communication assistance models 120 can be both trained and used locally at the user computing device 102. In some of such implementations, the user computing device 102 can implement the model trainer 160 to personalize the communication assistance models 120 based on user-specific data.

Figure 1B:
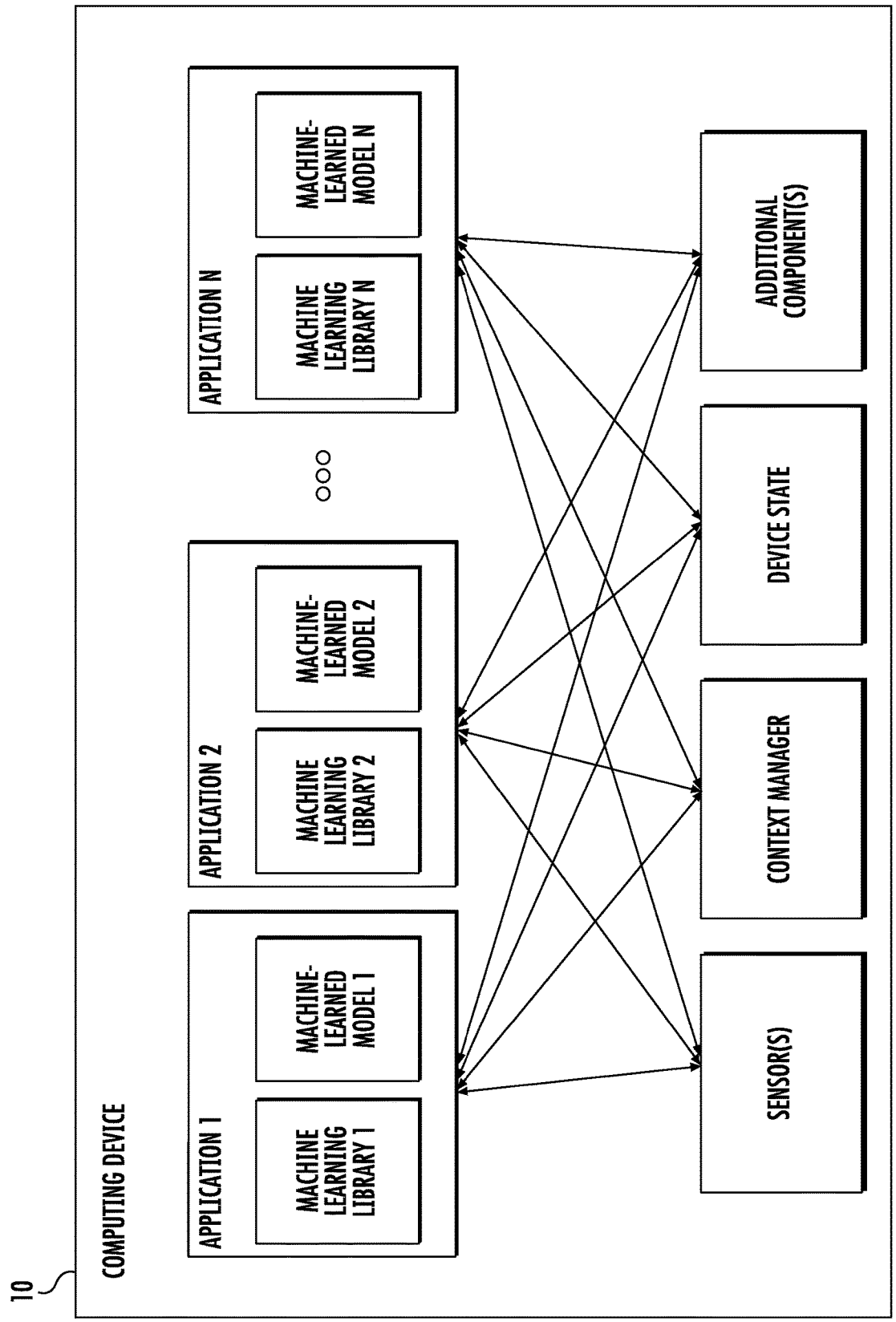
FIG. 1B depicts a block diagram of an example computing device according to example embodiments of the present disclosure.

FIG. 1B depicts a block diagram of an example computing device 10 that performs communication assistance according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned communication assistance model. Example applications include a text messaging application, an email application, a browser application, a photograph storage and management application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
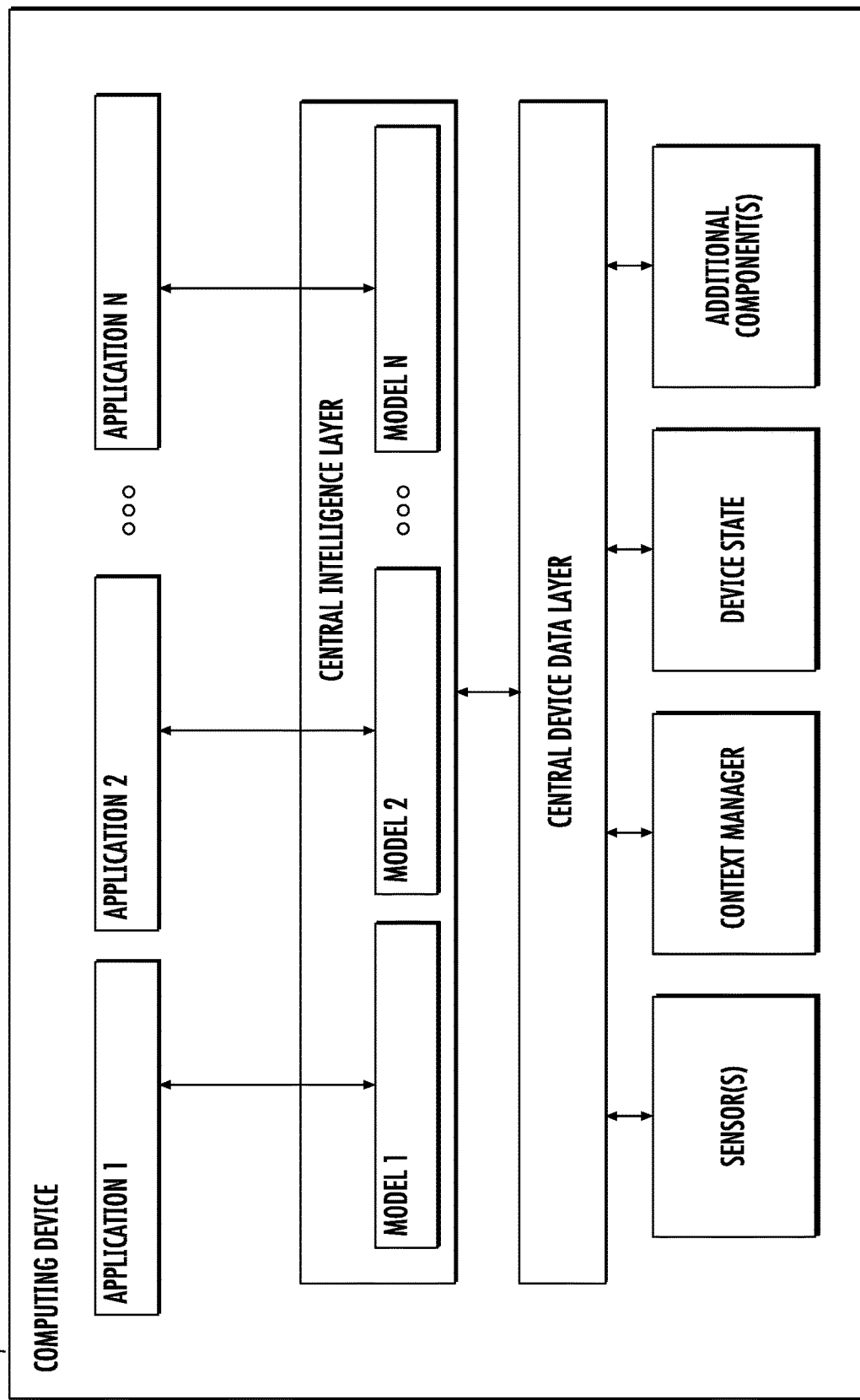
FIG. 1C depicts a block diagram of an example computing device according to example embodiments of the present disclosure.

FIG. 1C depicts a block diagram of an example computing device 50 that performs communication assistance according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a photograph storage and management application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a communication assistance model) can be provided for each application and managed by the central intelligence layer. In other implementations, two or more applications can share a single machine-learned model. For example, in some implementations, the central intelligence layer can provide a single model (e.g., a single communication assistance model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Methods

Figure 2:
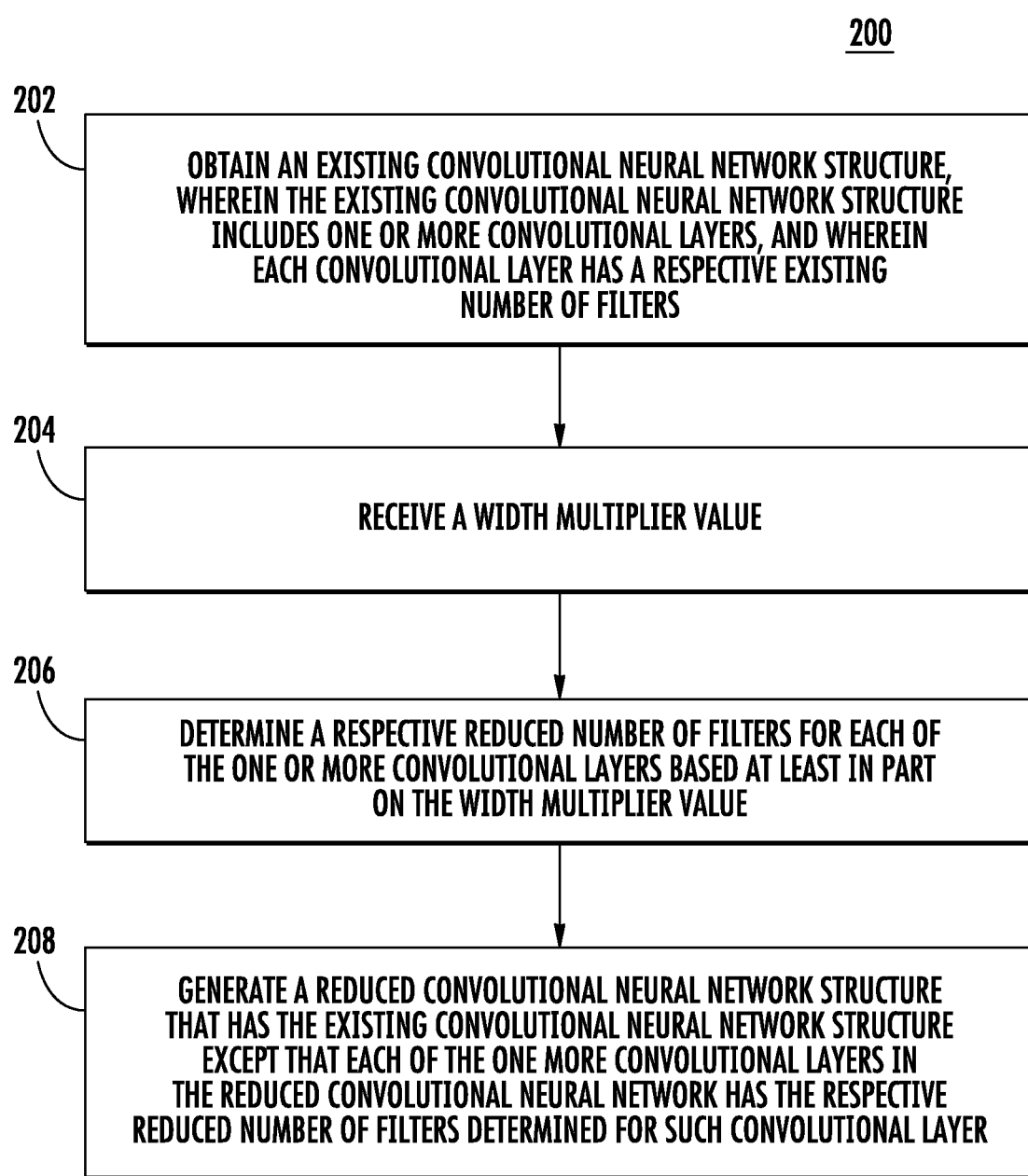
FIG. 2 depicts a flow chart diagram of an example method to reduce computational costs associated with convolutional neural networks according to example embodiments of the present disclosure.

FIG. 2 depicts a flow chart diagram of an example method 200 to reduce computational costs associated with convolutional neural networks according to example embodiments of the present disclosure. Although FIG. 2 depicts steps performed in a particular order for purposes of illustration and discussion, the methods of the present disclosure are not limited to the particularly illustrated order or arrangement. The various steps of the method 200 can be omitted, rearranged, combined, and/or adapted in various ways without deviating from the scope of the present disclosure.

At 202, a computing system obtains an existing convolutional neural network structure. The existing convolutional neural network structure can include one or more convolutional layers. Each of the one or more convolutional layers can have a respective existing number of filters.

In some implementations, each of the one or more convolutional layers in the existing convolutional neural network structure includes a depthwise separable convolution that includes a depthwise convolution layer and a pointwise convolution layer. Each of the depthwise convolution layer and the pointwise convolution layer can include the existing number of filters.

At 204, the computing system receives a width multiplier value. In some implementations, receiving the width multiplier value at 204 can include receiving the width multiplier value as a user input. In some implementations, receiving the width multiplier value at 204 can include receiving one or more desired performance parameters for the reduced convolutional neural network structure; and generating the width multiplier value based at least in part on the one or more desired performance parameters and one or more existing performance parameters associated with the existing convolutional neural network structure.

At 206, the computing system determines a respective reduced number of filters for each of the one or more convolutional layers based at least in part on the width multiplier value. The reduced number of filters for each convolutional layers can be less than the existing number of filters for such convolutional layer.

In some implementations, the one or more convolutional layers include a plurality of convolutional layers. In some of such implementations, determining the respective reduced number of filters for each of the plurality of convolutional layers at 206 can include uniformly applying the width multiplier to the respective existing number of filters for each of the plurality of convolutional layers.

At 208, the computing system generates a reduced convolutional neural network structure that has the existing convolutional neural network structure except that each of the one or more convolutional layers in the reduced convolutional neural network has the respective reduced number of filters determined for such convolutional layer.

In some implementations, generating the reduced convolutional neural network structure at 208 can include reconfiguring the existing convolutional neural network structure to reduce the number of filters included in each convolutional layer from the respective existing number of filters to the respective reduced number of filters determined for such convolutional layer.

In some implementations, method 200 can further include training a convolutional neural network that has the reduced convolutional neural network structure on a set of training data. In some implementations, method 200 can further include using, by a mobile computing device or an embedded computing device, a machine-learned convolutional neural network that has the reduced convolutional neural network structure to perform one or more of: image classification, fine grained recognition, geolocalization, face attribute classification, and object detection.

Figure 3:
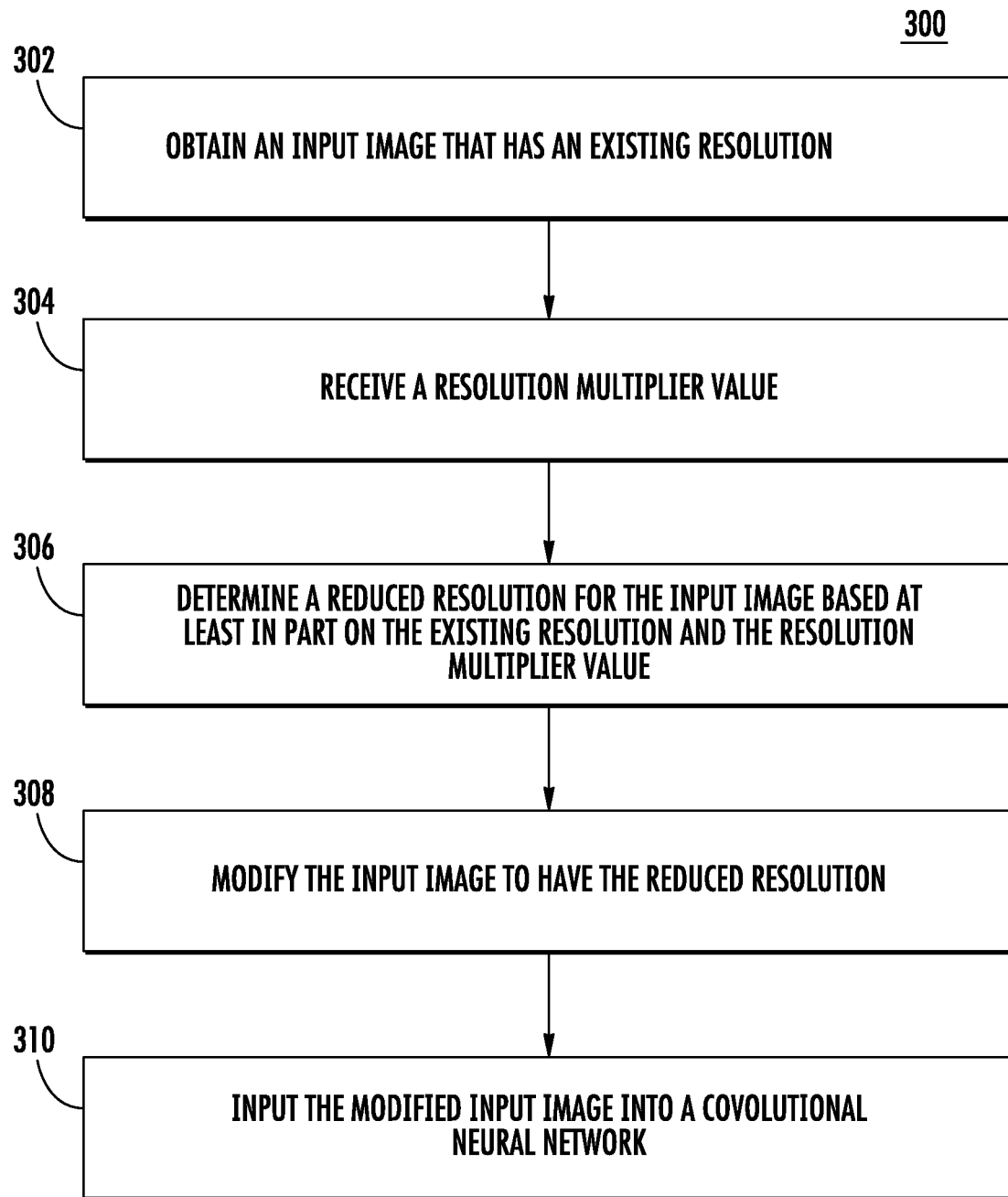
FIG. 3 depicts a flow chart diagram of an example method to reduce computational costs associated with convolutional neural networks according to example embodiments of the present disclosure.

FIG. 3 depicts a flow chart diagram of an example method 300 to reduce computational costs associated with convolutional neural networks according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system obtains an input image that has an existing resolution.

At 304, the computing system receives a resolution multiplier value. In some implementations, the resolution multiplier is received as a user input. In some implementations, receiving the resolution multiplier value at 304 can include receiving one or more desired performance parameters for the convolutional neural network; and generating the resolution multiplier value based at least in part on the one or more desired performance parameters and one or more existing performance parameters associated with the convolutional neural network.

At 306, the computing system determines a reduced resolution for the input image based at least in part on the existing resolution and the resolution multiplier value. In some implementations, determining the reduced resolution for the input image based at least in part on the existing resolution and the resolution multiplier value at 306 can include multiplying the existing resolution by the resolution multiplier value.

At 308, the computing system modifies the input image to have the reduced resolution. For example, any known technique for reducing image resolution can be used. At 310, the computing system inputs the modified input image into the convolutional neural network.

Example MobileNet Architecture

This section first describes the core layers that MobileNet is built on which are depthwise separable filters. Next, this section describes an example MobileNet network structure and concludes with descriptions of the two model shrinking hyper-parameters width multiplier and resolution multiplier.

Example Depthwise Separable Convolution

Figure 4A:
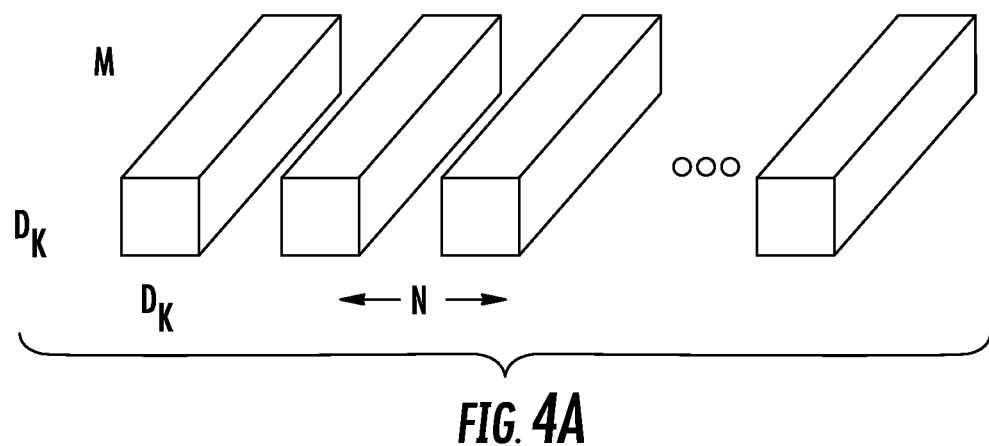
FIG. 4A depicts a graphical diagram of example standard convolution filters according to example embodiments of the present disclosure.
Figure 4B:
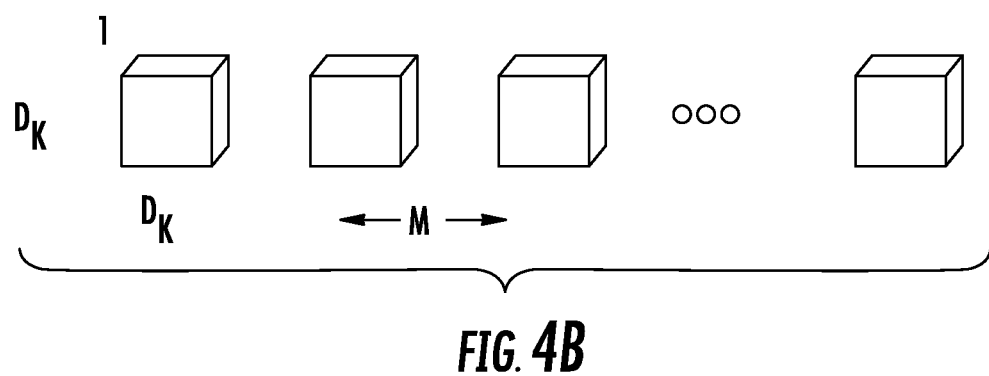
FIG. 4B depicts a graphical diagram of example depthwise convolutional filters according to example embodiments of the present disclosure.
Figure 4C:
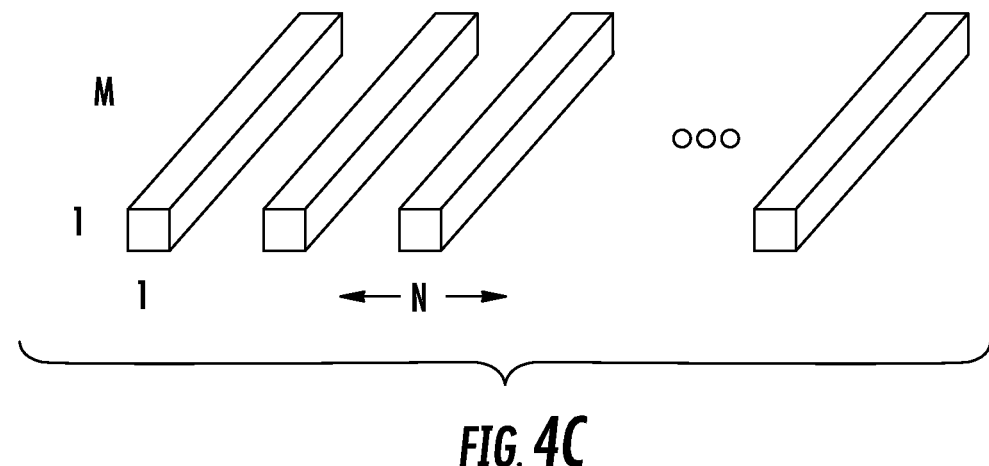
FIG. 4C depicts a graphical diagram of example pointwise convolutional filters according to example embodiments of the present disclosure.

The MobileNet model is based on depthwise separable convolutions which is a form of factorized convolutions which factorize a standard convolution into a depthwise convolution and a 1×1 convolution called a pointwise convolution. For MobileNets the depthwise convolution applies a single filter to each input channel. The pointwise convolution then applies a 1×1 convolution to combine the outputs the depthwise convolution. A standard convolution both filters and combines inputs into a new set of outputs in one step. The depthwise separable convolution splits this into two layers, a separate layer for filtering and a separate layer for combining. This factorization has the effect of drastically reducing computation and model size. FIGS. 4A-C show how a standard convolution (FIG. 4A) is factorized into a depthwise convolution (FIG. 4B) and a 1×1 pointwise convolution (FIG. 4C).

A standard convolutional layer takes as input a $D_F \times D_F \times M$ feature map F and produces a $D_F \times D_F \times N$ feature map G where $D_F$ is the spatial width and height of a square input feature map, M is the number of input channels (input depth), $D_G$ is the spatial width and height of a square output feature map and N is the number of output channel (output depth). For notational simplicity it is assumed that the output feature map has the same spatial dimensions as the input and both feature maps are square. The model shrinking results described herein generalize to feature maps with arbitrary sizes and aspect ratios.

The standard convolutional layer is parameterized by convolution kernel K of size $D_K \times D_K \times M \times N$ where $D_K$ is the spatial dimension of the kernel assumed to be square and M is number of input channels and N is the number of output channels as defined previously.

The output feature map for standard convolution assuming stride one and padding is computed as:

$$G_{k,l,n} = \sum_{i,j,m} K_{i,j,m,n} \cdot F_{k+i-1, l+j-1, m} \tag{1}$$

Standard convolutions have the computational cost of:

$$D_K \cdot D_K \cdot M \cdot N \cdot D_F \cdot D_F \tag{1}$$

where the computational cost depends multiplicatively on the number of input channels M, the number of output channels N the kernel size $D_k \times D_k$ and the feature map size $D_F \times D_F$. MobileNet models address each of these terms and their interactions. First it uses depthwise separable convolutions to break the interaction between the number of output channels and the size of the kernel.

The standard convolution operation has the effect of filtering features based on the convolutional kernels and combining features in order to produce a new representation. The filtering and combination steps can be split into two steps via the use of factorized convolutions called depthwise separable convolutions for substantial reduction in computational cost.

Depthwise separable convolution are made up of two layers: depthwise convolutions and pointwise convolutions. Depthwise convolutions can be used to apply a single filter per each input channel (input depth). Pointwise convolution, a simple 1×1 convolution, can then be used to create a linear combination of the output of the depthwise layer. MobileNets can use both batchnorm and ReLU nonlinearities for both layers.

Depthwise convolution with one filter per input channel (input depth) can be written as:

$$\hat{G}_{k,l,n} = \sum_{i,j} \hat{K}_{i,j,m,n} \cdot F_{k+i-1, l+j-1, m} \tag{3}$$

where $\hat{K}$ is the depthwise convolutional kernel of size $D_K \times D_K \times M$ where the $m_{th}$ filter in $\hat{K}$ is applied to the $m_{th}$ channel in F to produce the $m_{th}$ channel of the filtered output feature map $\hat{G}$.

Depthwise convolution has a computational cost of:

$$D_K \cdot D_K \cdot M \cdot D_F \cdot D_F \quad (2)$$

Depthwise convolution is extremely efficient relative to standard convolution. However it only filters input channels, it does not combine them to create new features. So an additional layer that computes a linear combination of the output of depthwise convolution via 1×1 convolution can be used in order to generate these new features.

The combination of depthwise convolution and 1×1 (pointwise) convolution is called depthwise separable convolution.

Depthwise separable convolutions cost:

$$D_K \cdot D_K \cdot M \cdot D_F \cdot D_F + M \cdot N \cdot D_F \cdot D_F \quad (3)$$

which is the sum of the depthwise and 1×1 pointwise convolutions.

By expressing convolution as a two step process of filtering and combining a reduction is achieved in computation of:

$$\frac{D_K \cdot D_K \cdot M \cdot D_F \cdot D_F + M \cdot N \cdot D_F \cdot D_F}{D_K \cdot D_K \cdot M \cdot N \cdot D_F \cdot D_F} = \frac{1}{N} + \frac{1}{D_K^2}$$

In some implementations, MobileNet uses 3×3 depthwise separable convolutions which uses between 8 to 9 times less computation than standard convolutions at only a small reduction in accuracy as seen in the example experiments section.

Additional factorization in spatial dimension does not save much additional computation as very little computation is spent in depthwise convolutions.

Example Network Structure and Training

The MobileNet structure is built on depthwise separable convolutions as mentioned in the previous section except, in some implementations, for the first layer which can be a full convolution. By defining the network in such simple terms network topologies are able to be easily explored to find a good network.

Figure 5:
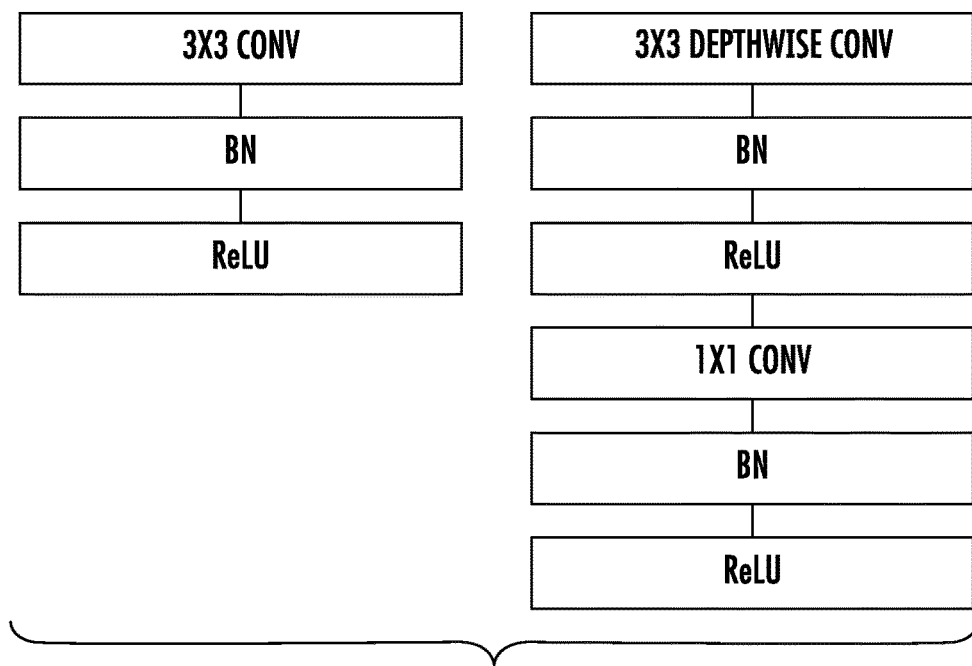
FIG. 5 depicts a block diagram of an example convolutional layer and an example separable convolution according to example embodiments of the present disclosure.

One example MobileNet architecture is defined in Table 1. In the example defined in Table 1, all layers are followed by a batchnorm (see, e.g., Ioffe, Sergey and Szegedy, Christian. Batch normalization: Accelerating deep network training by reducing internal covariate shift. *arXiv preprint arXiv:*1502.03167, 2015) and ReLU nonlinearity with the exception of the final fully connected layer which has no nonlinearity and feeds into a softmax layer for classification. FIG. 5 contrasts a layer with regular convolutions, batchnorm and ReLU nonlinearity (shown on left) to the factorized layer with depthwise convolution, 1×1 pointwise convolution as well as batchnorm and ReLU after each convolutional layer (shown on right).

FIG. 5: Left: Standard convolutional layer with batchnorm and ReLU. Right: Depthwise Separable convolutions with Depthwise and Pointwise layers followed by batchnorm and ReLU.

Down sampling is handled with strided convolution in the depthwise convolutions as well as in the first layer. A final average pooling reduces the spatial resolution to 1 before the fully connected layer. Counting depthwise and pointwise convolutions as separate layers, the example MobileNet of Table 1 has 28 layers.

In addition to defining networks in terms of a small number of Mult-Adds, it can also be beneficial to make sure these operations can be efficiently implementable. For instance unstructured sparse matrix operations are not typically faster than dense matrix operations until a very high level of sparsity. The example model structure puts nearly all of the computation into dense 1×1 convolutions. This can be implemented with highly optimized general matrix multiply (GEMM) functions. Often convolutions are implemented by a GEMM but require an initial reordering in memory called im2col in order to map it to a GEMM. For instance, this approach is used in the popular Caffe package (Jia, Yangqing and Shelhamer, Evan and Donahue, Jeff and Karayev, Sergey and Long, Jonathan and Girshick, Ross and Guadarrama, Sergio and Darrell, Trevor. Caffe: Convolutional Architecture for Fast Feature Embedding. *arXiv preprint arXiv:*1408.5093, 2014). 1×1 convolutions do not require this reordering in memory and can be implemented directly with GEMM which is one of the most optimized numerical linear algebra algorithms. The example MobileNet of Table 1 spends 95% of it's computation time in 1×1 convolutions which also has 75% of the parameters as can be seen in Table 2. Nearly all of the additional parameters are in the fully connected layer.

Example MobileNet models were trained in TensorFlow using RMSprop (Tieleman, Tijmen and Hinton, Geoffrey. Lecture 6.5-rmsprop: Divide the gradient by a running average of its recent magnitude. *COURSERA: Neural Networks for Machine Learning*, 4(2), 2012) with asynchronous gradient descent similar to Inception V3 (Szegedy, Christian and Vanhoucke, Vincent and Ioffe, Sergey and Shlens, Jonathon and Wojna, Zbigniew. Rethinking the inception architecture for computer vision. *arXiv preprint arXiv:* 1512.00567, 2015).

However, contrary to training large models, less regularization and data augmentation techniques were used because small models have less trouble with overfitting. When training MobileNets, side heads or label smoothing were not used and additionally the amount image of distortions was reduced by limiting the size of small crops that are used in large Inception training (see, Szegedy, Christian and Vanhoucke, Vincent and Ioffe, Sergey and Shlens, Jonathon and Wojna, Zbigniew. Rethinking the inception architecture for computer vision. *arXiv preprint arXiv:* 1512.00567, 2015).

Additionally, it was found that it was beneficial to put very little or no weight decay (l2 regularization) on the depthwise filters since there are so few parameters in them. For the Imagenet benchmarks in the next section all models were trained with same training parameters regardless of the size of the model.

TABLE 1

Example MobileNet Body Architecture

| Type/Stride | Filter Shape | Input Size |
|---|---|---|
| Conv/s2 | 3 × 3 × 3 × 32 | 224 × 224 × 3 |
| Conv dw/s1 | 3 × 3 × 32 dw | 112 × 112 × 32 |
| Conv/s1 | 1 × 1 × 32 × 64 | 112 × 112 × 32 |
| Conv dw/s2 | 3 × 3 × 64 dw | 112 × 112 × 64 |
| Conv/s1 | 1 × 1 × 64 × 128 | 56 × 56 × 64 |
| Conv dw/s1 | 3 × 3 × 128 dw | 56 × 56 × 128 |
| Conv/s1 | 1 × 1 × 128 × 128 | 56 × 56 × 128 |
| Conv dw/s2 | 3 × 3 × 128 dw | 56 × 56 × 128 |

TABLE 1-continued

Example MobileNet Body Architecture

| Type/Stride | Filter Shape | Input Size |
|---|---|---|
| Conv/s1 | 1 × 1 × 128 × 256 | 28 × 28 × 128 |
| Conv dw/s1 | 3 × 3 × 256 dw | 28 × 28 × 256 |
| Conv/s1 | 1 × 1 × 256 × 256 | 28 × 28 × 256 |
| Conv dw/s2 | 3 × 3 × 256 dw | 28 × 28 × 256 |
| Conv/s1 | 1 × 1 × 256 × 512 | 14 × 14 × 256 |
| 5 × Conv dw/s1 | 3 × 3 × 512 dw | 14 × 14 × 512 |
| Conv/s1 | 1 × 1 × 512 × 512 | 14 × 14 × 512 |
| Conv dw/s2 | 3 × 3 × 512 dw | 14 × 14 × 512 |
| Conv/s1 | 1 × 1 × 512 × 1024 | 7 × 7 × 512 |
| Conv dw/s1 | 3 × 3 × 1024 dw | 7 × 7 × 1024 |
| Conv/s1 | 1 × 1 × 1024 × 1024 | 7 × 7 × 1024 |
| Avg Pool/s1 | Pool 7 × 7 | 7 × 7 × 1024 |
| FC/s1 | 1024 × 1000 | 1 × 1 × 1024 |
| Softmax/s1 | Classifier | 1 × 1 × 1000 |

TABLE 2

Example Resource Per Layer Type

| Type | Mult-Adds | Parameters |
|---|---|---|
| Conv 1 × 1 | 94.86% | 74.59% |
| Conv DW 3 × 3 | 3.06% | 1.06% |
| Conv 3 × 3 | 1.19% | 0.02% |
| Fully Connected | 0.18% | 24.33% |

Example Width Multiplier: Thinner Models

Although the base MobileNet architecture is already small and low latency, many times a specific use case or application may require the model to be smaller and faster. In order to construct these smaller and less computationally expensive models a parameter α called width multiplier is introduced. The role of the width multiplier α is to thin a network uniformly at each layer. For a given layer and width multiplier α, the number of input channels M becomes αM and the number of output channels N becomes αN.

The computational cost of a depthwise separable convolution with width multiplier α is:

$$D_K \cdot D_K \cdot \alpha M \cdot D_F \cdot D_F + \alpha M \cdot \alpha N \cdot D_F \cdot D_F \quad (4)$$

where α∈(0,1] with example settings of 1, 0.75, 0.5 and 0.25. α=1 is the baseline MobileNet and α<1 are reduced MobileNets. Width multiplier has the effect of reducing computational cost and the number of parameters quadratically by roughly $\alpha^2$. Width multiplier can be applied to any model structure to define a new smaller model with a reasonable accuracy, latency and size trade off. It is used to define a new reduced structure that needs to be trained from scratch.

Example Resolution Multiplier: Reduced Representation

The second hyper-parameter to reduce the computational cost of a neural network is a resolution multiplier ρ. This can be applied to the input image and the internal representation of every layer is subsequently reduced by the same multiplier.

The computational cost for the core layers of an example network can be expressed as depthwise separable convolutions with width multiplier α and resolution multiplier ρ:

$$D_K \cdot D_K \cdot \alpha M \cdot \rho D_F \cdot \rho D_F + \alpha M \cdot \alpha N \cdot \rho D_F \cdot \rho D_F \quad (5)$$

where ρ∈(0,1] which is set so that the input resolution of the network is 224, 192, 160 or 128. ρ=1 is the baseline MobileNet and ρ<1 are reduced computation MobileNets. Resolution multiplier has the effect of reducing computational cost by $\rho^2$.

As an example, consider a typical layer in an example MobileNet and see how depthwise separable convolutions, width multiplier and resolution multiplier reduce the cost and parameters. Table 3 shows the computation and number of parameters for a layer as architecture shrinking methods are sequentially applied to the layer. The first row shows the Multi-Adds and parameters for a full convolutional layer with an input feature map of size 14×14×512 with a kernel K of size 3×3×512×512. The next section will examine in detail the trade offs between resources and accuracy.

TABLE 3

Example resource usage for modifications to standard convolution. Note that each row is a cumulative effect adding on top of the previous row. This example is for an example internal MobileNet layer with $D_K$ = 3, M = 512, N = 512, $D_F$ = 14.

| Layer/Modification | Million Mult-Adds | Million Parameters |
|---|---|---|
| Convolution | 462 | 2.36 |
| Depthwise Separable Conv | 52.3 | 0.27 |
| α = 0.75 | 29.6 | 0.15 |
| ρ = 0.714 | 15.1 | 0.15 |

Example Experiments

In this section the effects of depthwise convolutions are examined as well choice of shrinking by reducing the width of the network rather than the number of layers. Next, the trade offs of reducing the network based on the two hyper-parameters are shown: width multiplier and resolution multiplier. Example results are compared to a number of popular models. Finally, MobileNets are examined relative to a number of different applications.

Example Model Choices

First, results for an example MobileNet with depthwise separable convolutions are compared to a model built with full convolutions. Table 4 shows that using depthwise separable convolutions compared to full convolutions only reduces accuracy by 1% on Imagenet was saving tremendously on mult-adds and parameters.

TABLE 4

Example Depthwise Separable vs Full Convolution MobileNet

| Model | Imagenet Accuracy | Million Mult-Adds | Million Parameters |
|---|---|---|---|
| Conv MobileNet | 71.7% | 4866 | 29.3 |
| MobileNet | 70.6% | 569 | 4.2 |

Next, example results comparing thinner models with width multiplier to shallower models using less layers are provided. To make the example MobileNet of Table 1 shallower, the 5 layers of separable filters with feature size 14×14×512 in Table 1 are removed. Table 5 shows that at similar computation and number of parameters, that making example MobileNets thinner is 3% better than making them shallower.

TABLE 5

Example Narrow vs Shallow MobileNet

| Model | Imagenet Accuracy | Million Mult-Adds | Million Parameters |
|---|---|---|---|
| 0.75 MobileNet | 68.4% | 325 | 2.6 |
| Shallow MobileNet | 65.3% | 307 | 2.9 |

Example Model Shrinking Hyperparameters

Table 6 shows the accuracy, computation and size trade offs of shrinking the example MobileNet architecture of Table 1 with the width multiplier α. Accuracy drops off smoothly until the architecture is made too small at α=0.25.

TABLE 6

Example MobileNet Width Multiplier

| Width Multiplier | Imagenet Accuracy | Million Mult-Adds | Million Parameters |
|---|---|---|---|
| 1.0 MobileNet-224 | 70.6% | 569 | 4.2 |
| 0.75 MobileNet-224 | 68.4% | 325 | 2.6 |
| 0.5 MobileNet-224 | 63.7% | 149 | 1.3 |
| 0.25 MobileNet-224 | 50.6% | 41 | 0.5 |

Table 7 shows the accuracy, computation and size trade offs for different resolution multipliers by training example MobileNets with reduced input resolutions. Accuracy drops off smoothly across resolution.

TABLE 7

Example MobileNet Resolution

| Resolution | Imagenet Accuracy | Million Mult-Adds | Million Parameters |
|---|---|---|---|
| 1.0 MobileNet-224 | 70.6% | 569 | 4.2 |
| 1.0 MobileNet-192 | 69.1% | 418 | 4.2 |
| 1.0 MobileNet-160 | 67.2% | 290 | 4.2 |
| 1.0 MobileNet-128 | 64.4% | 186 | 4.2 |

Figure 6:
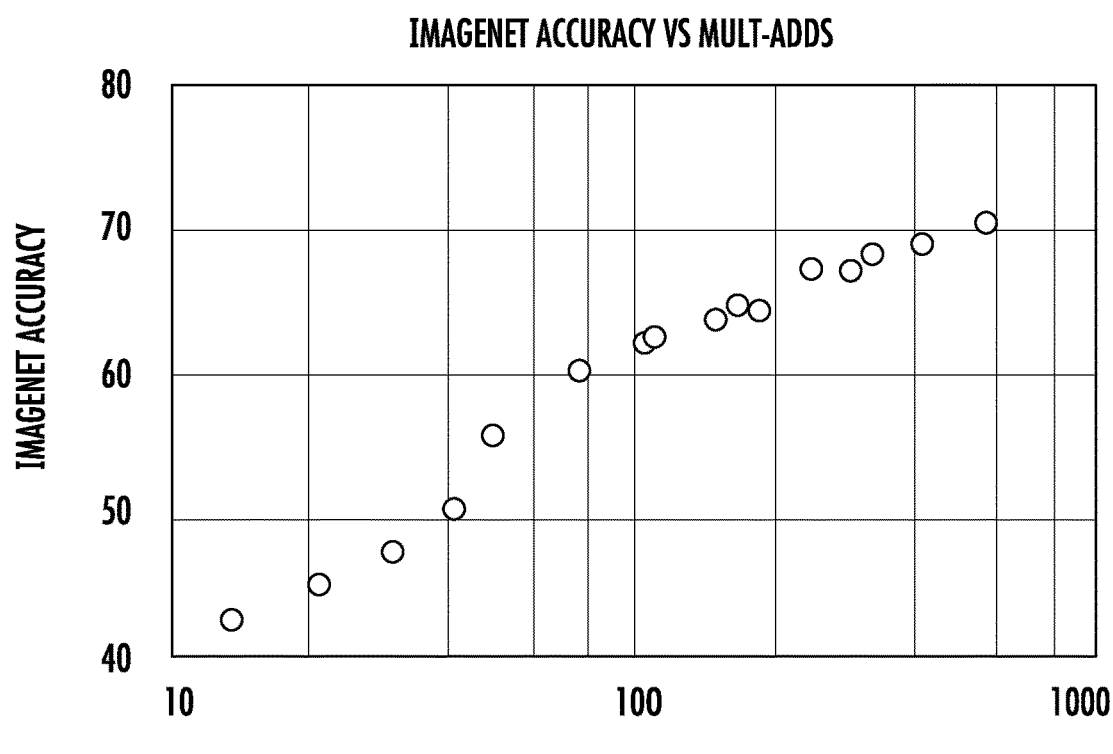
FIG. 6 depicts an example plot that demonstrates the trade off between computation and accuracy according to example embodiments of the present disclosure.

FIG. 6: This figure shows the trade off between computation (Mult-Adds) and accuracy on the Imagenet benchmark. Note the log linear dependence between accuracy and computation.

In particular, FIG. 6 shows the trade off between Imagenet Accuracy and computation for the 16 models made from the cross product of width multiplier α∈{1, 0.75, 0.5, 0.25} and resolutions {224,192,160,128}. Results are log linear with a jump when models get very small at α=0.25.

Figure 7:
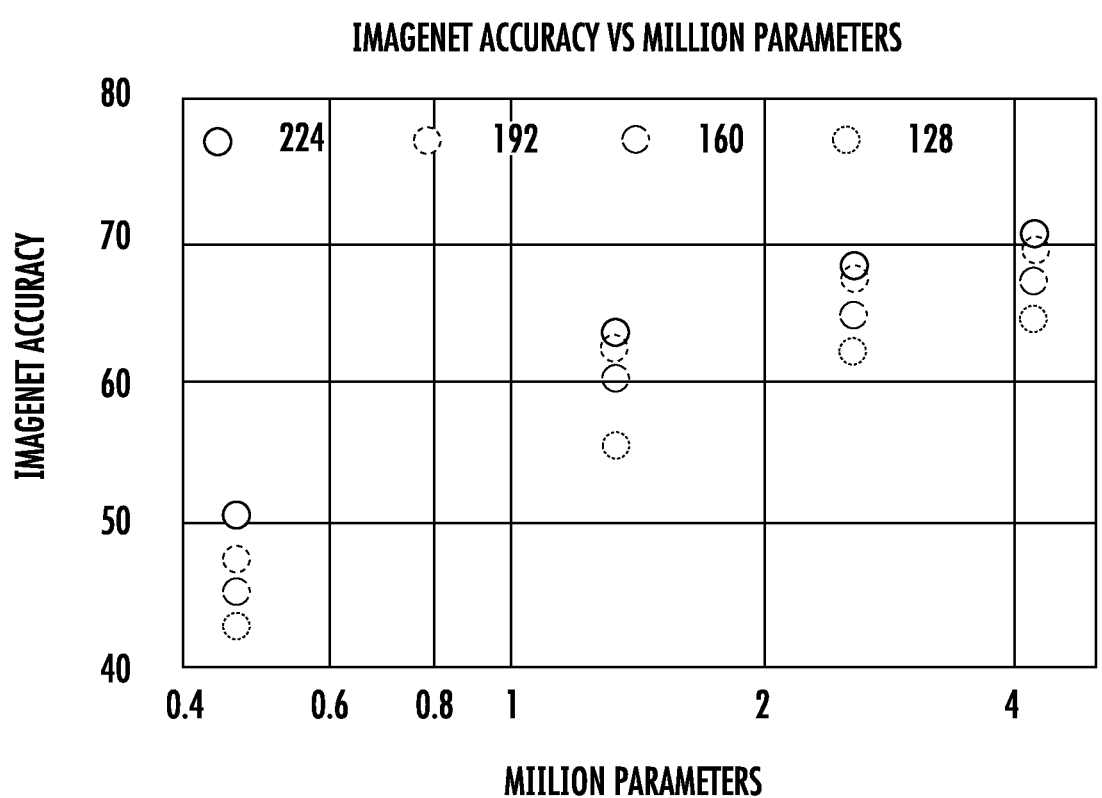
FIG. 7 depicts an example plot that demonstrates the trade off between number of parameters and accuracy according to example embodiments of the present disclosure.

FIG. 7: This figure shows the trade off between the number of parameters and accuracy on the Imagenet benchmark. Different input resolutions are shown. The number of parameters do not vary based on the input resolution.

In particular, FIG. 7 shows the trade off between Imagenet Accuracy and number of parameters for the 16 models made from the cross product of width multiplier α∈{1, 0.75, 0.5, 0.25} and resolutions {224,192,160,128}.

Table 8 compares the full example MobileNet of Table 1 to the original GoogleNet (Szegedy, Christian and Liu, Wei and Jia, Yangqing and Sermanet, Pierre and Reed, Scott and Anguelov, Dragomir and Erhan, Dumitru and Vanhoucke, Vincent and Rabinovich, Andrew. Going deeper with convolutions. *Proceedings of the IEEE Conference on Computer Vision and Pattern Recognition*, pages 1-9, 2015) and VGG16 (Simonyan, Karen and Zisserman, Andrew. Very deep convolutional networks for large-scale image recognition. *arXiv preprint arXiv:*1409.1556, 2014). The example MobileNet is nearly as accurate as VGG16 while being 32× smaller and 27× less compute intensive. It is more accurate than GoogleNet while being smaller and more than 2.5× less computation.

TABLE 8

Example MobileNet Comparison to Popular Models

| Model | Imagenet Accuracy | Million Mult-Adds | Million Parameters |
|---|---|---|---|
| 1.0 MobileNet-224 | 70.6% | 569 | 4.2 |
| GoogleNet | 69.8% | 1550 | 6.8 |
| VGG 16 | 71.5% | 15300 | 138 |

Table 9 compares an example reduced MobileNet with width multiplier α=0.5 and reduced resolution 160×160. Reduced MobileNet is 4% better than AlexNet (Krizhevsky, Alex and Sutskever, Ilya and Hinton, Geoffrey E. Imagenet classification with deep convolutional neural networks. *Advances in neural information processing systems*, pages 1097-1105, 2012) while being 45× smaller and 9.4× less compute than AlexNet. It is also 4% better than Squeezenet (landola, Forrest N and Moskewicz, Matthew W and Ashraf, Khalid and Han, Song and Dally, William J and Keutzer, Kurt. SqueezeNet: AlexNet-level accuracy with 50× fewer parameters and <1 MB model size. *arXiv preprint arXiv:* 1602.07360, 2016) at about the same size and 22× less computation.

TABLE 9

Example Smaller MobileNet Comparison to Popular Models

| Model | Imagenet Accuracy | Million Mult-Adds | Million Parameters |
|---|---|---|---|
| 0.50 MobileNet-160 | 60.2% | 76 | 1.32 |
| Squeezenet | 57.5% | 1700 | 1.25 |
| AlexNet | 57.2% | 720 | 60 |

Example Fine Grained Recognition

An example MobileNet was trained for fine grained recognition on the Stanford Dogs dataset (Aditya Khosla and Nityananda Jayadevaprakash and Bangpeng Yao and Li Fei-Fei. Novel Dataset for Fine-Grained Image Categorization. *First Workshop on Fine-Grained Visual Categorization, IEEE Conference on Computer Vision and Pattern Recognition*, Colorado Springs, Co., 2011). The approach of Krause et al. (Krause, Jonathan and Sapp, Benjamin and Howard, Andrew and Zhou, Howard and Toshev, Alexander and Duerig, Tom and Philbin, James and Fei-Fei, Li. The Unreasonable Effectiveness of Noisy Data for Fine-Grained Recognition. *arXiv preprint arXiv:*1511.06789, 2015) was extended and an even larger but noisy training set than Krause et al. was collected from the web. The noisy web data was used to pre-train a fine grained dog recognition model and then fine tune the model on the Stanford Dogs training set. Results on Stanford Dogs test set are in Table 10. The example MobileNet can almost achieve the state of the art results from Krause et al. at greatly reduced computation and size.

TABLE 10

MobileNet for Stanford Dogs

| Model | Top-1 Accuracy | Million Mult-Adds | Million Parameters |
|---|---|---|---|
| Inception V3 | 84% | 5000 | 23.2 |
| 1.0 MobileNet-224 | 83.3% | 569 | 3.3 |
| 0.75 MobileNet-224 | 81.9% | 325 | 1.9 |
| 1.0 MobileNet-192 | 81.9% | 418 | 3.3 |
| 0.75 MobileNet-192 | 80.5% | 239 | 1.9 |

Example Large Scale Geolocalization

PlaNet (Weyand, Tobias and Kostrikov, Ilya and Philbin, James. PlaNet—Photo Geolocation with Convolutional Neural Networks. *European Conference on Computer Vision (ECCV)*, 2016) casts the task of determining where on earth a photo was taken as a classification problem. The approach divides the earth into a grid of geographic cells that serve as the target classes and trains a convolutional neural network on millions of geo-tagged photos. PlaNet has been shown to successfully localize a large variety of photos and to outperform Im2GPS (Hays, James and Efros, Alexei. IM2GPS: estimating geographic information from a single image. *Proceedings of the IEEE International Conference on Computer Vision and Pattern Recognition*, 2008; Hays, James and Efros, Alexei. Large-Scale Image Geolocalization. In Choi, Jaeyoung and Friedland, Gerald, editors, *Multimodal Location Estimation of Videos and Images*. Springer, 2014) that addresses the same task.

PlaNet was re-trained using the example MobileNet architecture on the same data. While the full PlaNet model based on the Inception V3 architecture (Szegedy, Christian and Vanhoucke, Vincent and Ioffe, Sergey and Shlens, Jonathon and Wojna, Zbigniew. Rethinking the inception architecture for computer vision. *arXiv preprint arXiv:*1512.00567, 2015) has 52 M params (5.74B Mult-Adds), the example MobileNet model has only 13 M params (0.578B Mult-Adds). As shown in Table 11, the example MobileNet version delivers only slightly decreased performance compared to PlaNet despite being much more compact. Moreover, it still outperforms Im2GPS by a large margin.

TABLE 11

Performance of PlaNet using the MobileNet architecture. Percentages are the fraction of the Im2GPS test dataset that were localized within a certain distance from the ground truth. The numbers for the original PlaNet model are based on an updated version that has an improved architecture and training dataset.

| Scale | Im2GPS | PlaNet | PlaNet MobileNet |
|---|---|---|---|
| Continent (2500 km) | 51.9% | 77.6% | 79.3% |
| Country (750 km) | 35.4% | 64.0% | 60.3% |
| Region (200 km) | 32.1% | 51.1% | 45.2% |
| City (25 km) | 21.9% | 31.7% | 31.7% |
| Street (1 km) | 2.5% | 11.0% | 11.4% |

Example Face Attributes

Another use-case for MobileNet is compressing large systems with unknown or esoteric training procedures. In a face attribute classification task, a synergistic relationship between MobileNet and distillation (Hinton, Geoffrey and Vinyals, Oriol and Dean, Jeff. Distilling the knowledge in a neural network. *arXiv preprint arXiv:*1503.02531, 2015), a knowledge transfer technique for deep networks, is demonstrated. An in-house face attribute classifier with 75 M parameters and 1600 Mult-Adds was also compressed. The classifier is trained on a multi-attribute dataset similar to YFCC100 M (Thomee, Bart and Shamma, David A and Friedland, Gerald and Elizalde, Benjamin and Ni, Karl and Poland, Douglas and Borth, Damian and Li, Li-Jia. YFCC100 M: The new data in multimedia research. *Communications of the ACM*, 59(2):64-73, 2016).

A face attribute classifier was distilled using the example MobileNet architecture. Distillation works by training the classifier to emulate the outputs of the in-house system instead of the ground-truth labels, hence enabling training from large (and potentially infinite) unlabeled datasets. The emulation quality is measured by averaging the per-attribute cross-entropy over all attributes. Marrying the scalability of distillation training and the parsimonious parameterization of MobileNet, the end system not only requires no regularization (e.g. weight-decay and early-stopping), but also demonstrates enhanced performances. It is evident from Table 12 that the example MobileNet-based classifier is resilient to aggressive model shrinking: it achieves a similar mean average precision across attributes (mean AP) as the in-house while consuming only 1% the Multi-Adds.

TABLE 12

Face attribute classification using the MobileNet architecture. Each row corresponds to a different hyper-parameter setting (width multiplier α and image resolution).

| Width Multiplier/ Resolution | Mean AP | Million Mult-Adds | Million Parameters |
|---|---|---|---|
| 1.0 MobileNet-224 | 88.7% | 568 | 3.2 |
| 0.5 MobileNet-224 | 88.1% | 149 | 0.8 |
| 0.25 MobileNet-224 | 87.2% | 45 | 0.2 |
| 1.0 MobileNet-128 | 88.1% | 185 | 3.2 |
| 0.5 MobileNet-128 | 87.7% | 48 | 0.8 |
| 0.25 MobileNet-128 | 86.4% | 15 | 0.2 |
| Baseline | 86.9% | 1600 | 7.5 |

Example Object Detection

MobileNets can also be deployed as an effective base network in modern object detection systems. Example results are provided for an example MobileNet trained for object detection on COCO data based on the recent work that won the 2016 COCO challenge (Anonymous. Speed and accuracy trade-offs for modern convolutional object detectors. *Submitted to CVPR* 2017, 2016). In table 13, an example MobileNet is compared to VGG and Inception V2 under both Faster-RCNN (Ren, Shaoqing and He, Kaiming and Girshick, Ross and Sun, Jian. Faster R-CNN: Towards real-time object detection with region proposal networks. *Advances in neural information processing systems*, pages 91-99, 2015) and SSD (Liu, Wei and Anguelov, Dragomir and Erhan, Dumitru and Szegedy, Christian and Reed, Scott. SSD: Single Shot MultiBox Detector. *arXiv preprint arXiv:* 1512.02325, 2015) framework. In the example experiments, SSD is evaluated with 300 input resolution (SSD 300) and Faster-RCNN is compared with both 300 and 600 input resolution (Faster-RCNN 300, Faster-RCNN 600). The Faster-RCNN model evaluates 300 RPN proposal boxes per image. The models are trained on COCO train+val excluding 8 k minival images and evaluated on minival. For both frameworks, the example MobileNet achieves comparable results to other networks with only a fraction of computational complexity and model size.

TABLE 13

Example COCO object detection results comparison using different frameworks and network architectures. mAP is reported with COCO primary challenge metric (AP at IoU = .50:.05:.95)

| Framework Resolution | Model | mAP | Billion Mult-Adds | Million Parameters |
|---|---|---|---|---|
| SSD 300 | deeplab-VGG | 21.1% | 34.9 | 33.1 |
| | Inception V2 | 22.0% | 3.8 | 13.7 |
| | MobileNet | 19.3% | 1.2 | 6.8 |
| Faster-RCNN 300 | VGG | 22.9% | 64.3 | 138.5 |
| | Inception V2 | 15.4% | 118.2 | 13.3 |
| | MobileNet | 16.4% | 25.2 | 6.1 |
| Faster-RCNN 600 | VGG | 25.7% | 149.6 | 138.5 |
| | Inception V2 | 21.9% | 129.6 | 13.3 |
| | Mobilenet | 19.8% | 30.5 | 6.1 |

Example Face Embeddings

The FaceNet model is a state of the art face recognition model (Schroff, Florian and Kalenichenko, Dmitry and Philbin, James. Facenet: A unified embedding for face recognition and clustering. *Proceedings of the IEEE Conference on Computer Vision and Pattern Recognition*, pages 815-823, 2015). It builds face embeddings based on the triplet loss. To build a mobile FaceNet model, distillation was used to train by minimizing the squared differences of the output of FaceNet and an example MobileNet on the training data. Results for very small example MobileNet models can be found in Table 14.

TABLE 14

Example MobileNet Distilled from FaceNet

| Model | 1e−4 Accuracy | Million Mult-Adds | Million Parameters |
|---|---|---|---|
| FaceNet | 83% | 1600 | 7.5 |
| 1.0 MobileNet-160 | 79.4% | 286 | 4.9 |
| 1.0 MobileNet-128 | 78.3% | 185 | 5.5 |
| 0.75 MobileNet-128 | 75.2% | 166 | 3.4 |
| 0.75 MobileNet-128 | 72.5% | 108 | 3.8 |

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method associated with a convolutional neural network, the method comprising:
   receiving, by one or more computing devices, a width multiplier value;
   receiving an input feature map by the one or more computing devices, the input feature map associated with a first number of channels, wherein the input feature map can be represented as $D_F \times D_F \times M$ of an input image, where $D_F$ is a spatial width and a height of the input feature map and M is the first number of channels; and
   processing, by the one or more computing devices, the input feature map using a depthwise convolution layer in order to generate an output feature map, wherein the depthwise convolution layer has a kernel with kernel size of $D_K \times D_K \times \alpha M$, where $D_K$ is a spatial dimension of the kernel, M is the first number of channels, and a represents the width multiplier value, and wherein the output feature map is associated with a second number of channels; and
   wherein the second number of channels is the first number of channels multiplied by the width multiplier value; and
   wherein a computational cost for the depthwise convolution layer is determined as $D_K \cdot D_K \cdot D_F \cdot D_F \cdot \alpha M$.

2. The computer-implemented method of claim 1, further comprising:
   receiving, by the one or more computing devices, one or more desired performance parameters for the convolutional neural network; and
   generating, by the one or more computing devices, the width multiplier value based at least in part on the one or more desired performance parameters.

3. The computer-implemented method of claim 1, further comprising:
   processing, by the one or more computing devices, the output feature map with a pointwise convolution layer.

4. The computer-implemented method of claim 1, wherein receiving the width multiplier value comprises receiving the width multiplier value as a user input.

5. The computer-implemented method of claim 1, wherein the width multiplier value controls a trade off between computation and accuracy.

6. A convolutional neural network structure that is stored on a non-transitory computer-readable media and optimized for mobile or embedded applications, the convolutional neural network structure comprising:
   a depthwise convolution layer and a pointwise convolution layer;
   wherein the depthwise convolution layer is configured to process an input feature map associated with a first number of channels to generate an output feature map associated with a second number of channels, such that the second number of channels is the first number of channels multiplied by a user-specified parameter;

wherein the input feature map can be represented as $D_F \times D_F \times M$ of an input image, where $D_F$ is a spatial width and a height of the input feature map and M is the first number of channels;

the depthwise convolution layer has a kernel with kernel size of $D_K \times D_K \times \alpha M$, where $D_K$ is a spatial dimension of the kernel, M is the first number of channels, and $\alpha$ represents the user-specified parameter; and a computational cost for the depthwise convolution layer is determined as $D_K \cdot D_K \cdot D_F \cdot D_F \cdot \alpha M$.

7. The convolutional neural network structure of claim 6, wherein the convolutional neural network structure has been generated by modification of an existing convolutional neural network structure.

8. The convolutional neural network structure of claim 7, wherein the existing convolutional neural network structure comprises a convolutional layer that has an existing number of filters and modification of the existing convolutional neural network structure comprises generation of the depthwise convolution layer that comprises a number of filters equal to the second number of channels.

9. The convolutional neural network structure of claim 6, wherein the user-specified parameter controls a trade off between computation and accuracy.

10. The convolutional neural network structure of claim 6, wherein the pointwise convolution layer has a number of filters equal to the second number of channels.

\* \* \* \* \*